United States Patent
Groeschel et al.

(10) Patent No.: US 9,097,568 B2
(45) Date of Patent: Aug. 4, 2015

(54) SYSTEM AND METHOD FOR METER SUBSTITUTION FOR CO-LOCATED FLOWMETERS

(75) Inventors: Kerry D. Groeschel, Houston, TX (US); Graham W. Forbes, Houston, TX (US)

(73) Assignee: DANIEL MEASUREMENT AND CONTROL, INC., Houston, TX (US)

( * ) Notice: Subject to any disclaimer, the term of this patent is extended or adjusted under 35 U.S.C. 154(b) by 616 days.

(21) Appl. No.: 13/462,579

(22) Filed: May 2, 2012

(65) Prior Publication Data

US 2013/0291649 A1 Nov. 7, 2013

(51) Int. Cl.
  *G06F 19/00* (2011.01)
  *G01F 1/66* (2006.01)
(52) U.S. Cl.
  CPC ............... *G01F 1/662* (2013.01); *G01F 1/667* (2013.01)
(58) Field of Classification Search
  CPC ................................. G01F 1/662; G01F 1/667
  USPC ................. 702/39, 45, 50, 96, 100, 142, 171; 73/24.01, 861.18, 861.25, 861.27, 73/861.29, 861.31
  See application file for complete search history.

(56) References Cited

U.S. PATENT DOCUMENTS

| | | | |
|---|---|---|---|
| 4,596,133 A | 6/1986 | Smalling et al. | |
| 6,494,105 B1 | 12/2002 | Gallagher | |
| 6,837,113 B1 | 1/2005 | Freund et al. | |
| 7,523,676 B2 * | 4/2009 | Li et al. | 73/861.25 |
| 7,752,919 B2 | 7/2010 | Straub, Jr. et al. | |
| 7,942,068 B2 * | 5/2011 | Ao et al. | 73/861.31 |
| 2004/0011141 A1 | 1/2004 | Lynnworth | |

OTHER PUBLICATIONS

International Application No. PCT/US2013/039206, "PCT International Search Report and Written Opinion Dated Sep. 25, 2013," 10 pages.
Sick Maihak GmbH, "FLOWSIC600 Ultrasonic Gas Flow Meter," Reute, Germany, Jan. 2010, 4 pages.
Cameron International Corporation, "Caldon® LEFM® 280Ci Ultrasonic Flow Meter," Houston, Texas, 2010, 6 pages.

* cited by examiner

*Primary Examiner* — John H Le
(74) *Attorney, Agent, or Firm* — Conley Rose, P.C.

(57) ABSTRACT

A system and method for ultrasonic flow metering. In one embodiment, an ultrasonic flow metering system includes a plurality of ultrasonic flowmeters. Each of the ultrasonic flowmeters includes a flow processor. The flow processor is configured to maintain a plurality of velocity bins, each of the bins corresponding to a flow velocity range for the flowmeters. The flow processor is also configured to maintain, within each of the bins, a value indicative of past average velocity of fluid flow through a given one of the flowmeters associated with a given one of the bins. The flow processor is further configured to determine, responsive to one of the flowmeters having failed, an estimated average fluid flow velocity through the system based on the values maintained within the bins.

30 Claims, 7 Drawing Sheets

SYSTEM AND METHOD FOR METER SUBSTITUTION FOR CO-LOCATED FLOWMETERS

BACKGROUND

After hydrocarbons have been removed from the ground, the fluid stream (e.g., crude oil, natural gas, etc.) is transported from place-to-place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable, and in these situations flowmeters may be used.

Ultrasonic flowmeters are one type of flowmeter that may be used to measure the amount of fluid flowing in a pipeline. In an ultrasonic flowmeter, ultrasonic signals are sent back and forth across the fluid stream to be measured, and based on various characteristics of the ultrasonic signals a measure of fluid flow may be calculated. Ultrasonic flowmeters providing improved flow measurement accuracy and fault immunity are desirable.

SUMMARY

A system and method for ultrasonic flow metering when one of a plurality of co-located ultrasonic flowmeters has failed is disclosed herein. In one embodiment, an ultrasonic flow metering system includes a plurality of ultrasonic flowmeters. Each of the ultrasonic flowmeters includes a flow processor. The flow processor is configured to maintain a plurality of velocity bins, each of the bins corresponding to a flow velocity range for the flowmeters. The flow processor is also configured to maintain, within each of the bins, a value indicative of past average velocity of fluid flow through a given one of the flowmeters associated with a given one of the bins. The flow processor is further configured to determine, responsive to one of the flowmeters having failed, an estimated average fluid flow velocity through the system based on the values maintained within the bins.

In another embodiment, a method for flowmeter substitution includes dividing a fluid flow velocity measurement range of a plurality of serially coupled ultrasonic flowmeters into a plurality of velocity subranges. A plurality of bins is maintained by each of the flowmeters. Each of the bins corresponds to one of the velocity subranges. A value indicative of average flow velocity through a given one of the flowmeters is maintained within each of the bins. Responsive to failure of one of the flowmeters, an estimated average flow velocity through the plurality of flowmeters is determined based on the values maintained within the bins.

In a further embodiment, an ultrasonic flowmeter includes a passage for fluid flow, a pair of ultrasonic transducers, and a flow processor. The pair of ultrasonic transducers is configured to form a chordal path across the passage between the transducers. The flow processor is coupled to the ultrasonic transducers, and configured to measure the flow velocity of a fluid stream flowing through the passage based on outputs of the transducers. The flow processor is also configured to exchange measured flow velocity values with a different flowmeter disposed to measure flow velocity of the fluid stream. The flow processor is further configured to compute, in response to failure of the different flowmeter, an estimated average flow velocity of the fluid stream based on the flow velocity measured by the flow processor and a historical value of flow velocity for the different flowmeter maintained by the flow processor.

NOTATION AND NOMENCLATURE

Figure 1:
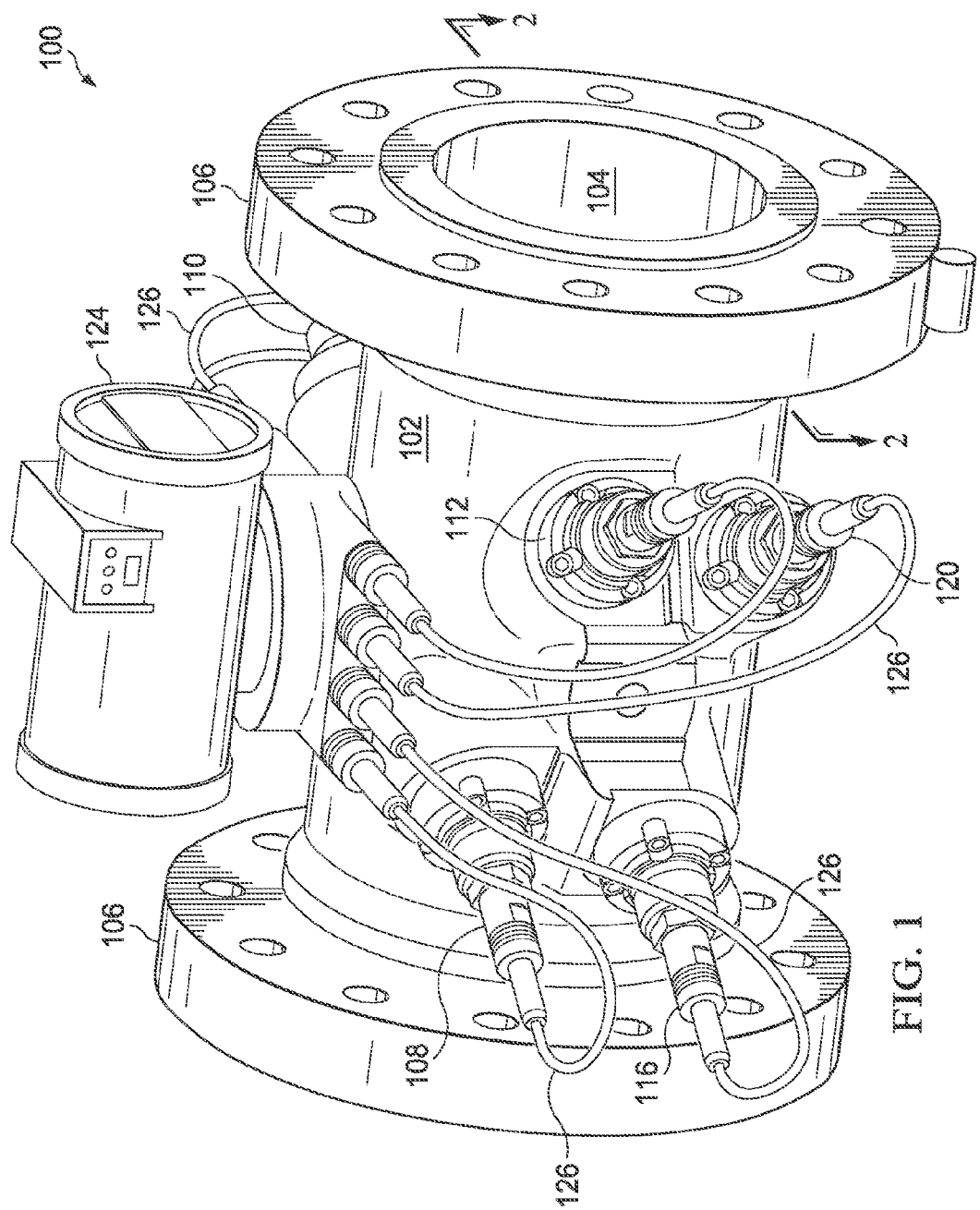
FIG. 1 shows an ultrasonic flowmeter in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," " is included within the definition of software. The recitation "based on" is intended to mean "based at least in part on." Therefore, if X is based on Y, X may be based on Y and any number of other factors. The term "flow rate" as used herein refers to the rate of volumetric flow.

DETAILED DESCRIPTION

The following description is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow (e.g., cryogenic substances, water, etc.).

FIG. 1 shows an ultrasonic flowmeter 100 in accordance with various embodiments. The ultrasonic flowmeter 100 includes a meter body or spool piece 102 that defines a central passage or bore 104. The spool piece 102 is designed and constructed to be coupled to a pipeline or other structure (not shown) carrying fluids (e.g., natural gas) such that the fluids flowing in the pipeline travel through the central bore 104. While the fluids travel through the central bore 104, the ultrasonic flowmeter 100 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flowmeter 100 includes a plurality of transducer assemblies. In the view of FIG. 1 five such transducers assembles 108, 110, 112, 116 and 120 are in full or partial view. The transducer assemblies are paired (e.g., transducer assemblies 108 and 110), as will be further discussed below. Moreover, each transducer assembly electrically couples to control electronics 124, illustratively housed in an enclosure. More particularly, each transducer assembly electrically couples to the control electronics 124 by way of a respective cable 126 or equivalent signal conducting assembly.

Figure 2:
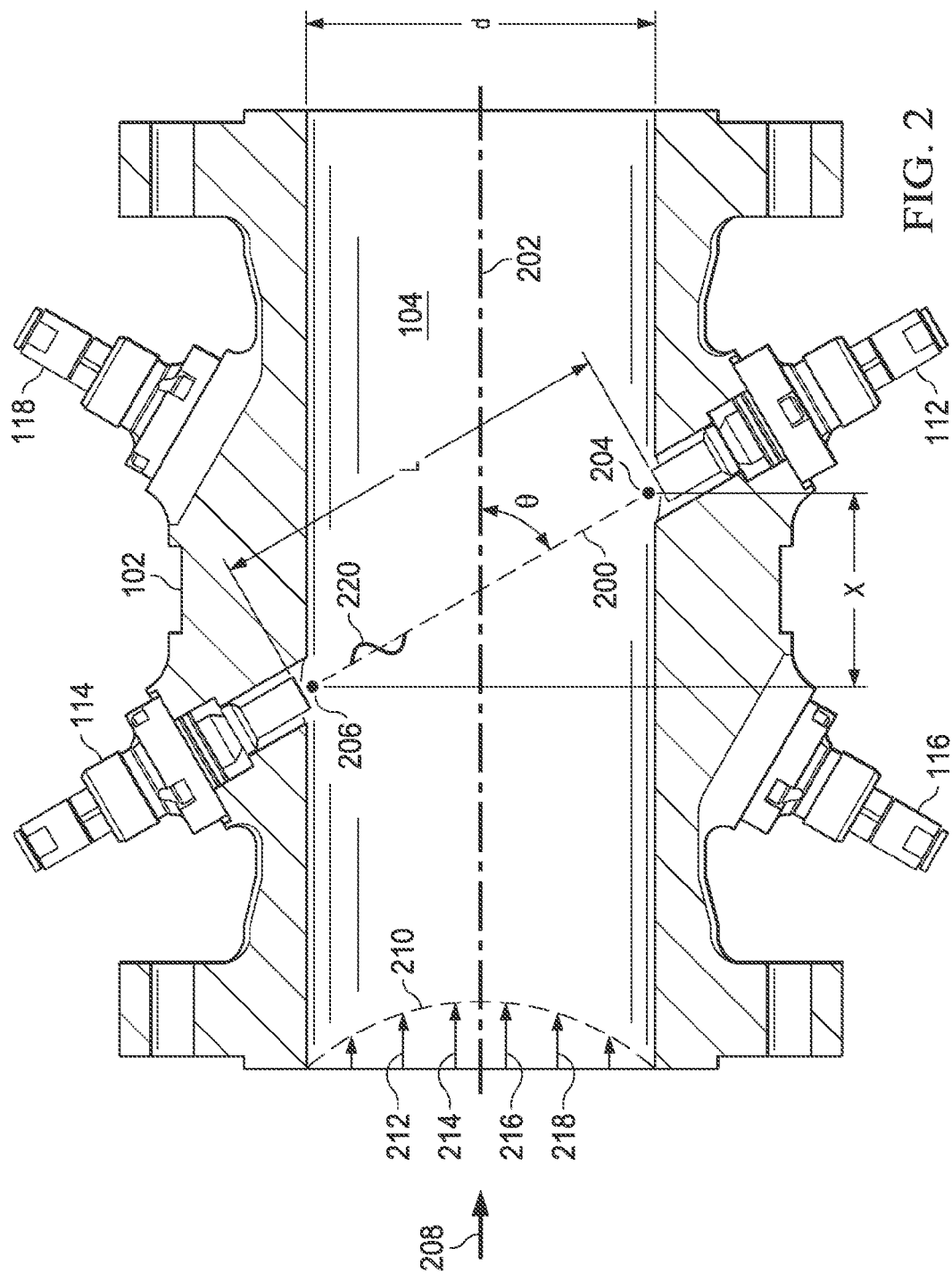
FIG. 2 shows a cross-sectional overhead view of an ultrasonic flowmeter in accordance with various embodiments.

FIG. 2 shows a cross-sectional overhead view of the ultrasonic flowmeter 100 taken substantially along line 2-2 of FIG. 1. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics associated with the flowmeter 100.

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length "d" corresponding to the pipe inside diameter. In most cases distances d, X and L are precisely determined during flowmeter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Some time later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than the transit time for an ultrasonic signal traveling upstream (i.e., against the fluid flow). The upstream and downstream transit times can be used to calculate the average velocity along the signal path, and the speed of sound in the measured fluid. Given the cross-sectional measurements of the flowmeter 100 carrying the fluid, the average velocity over the area of the central bore 104 may be used to find the volume of fluid flowing through the spool piece 102.

Figure 3:
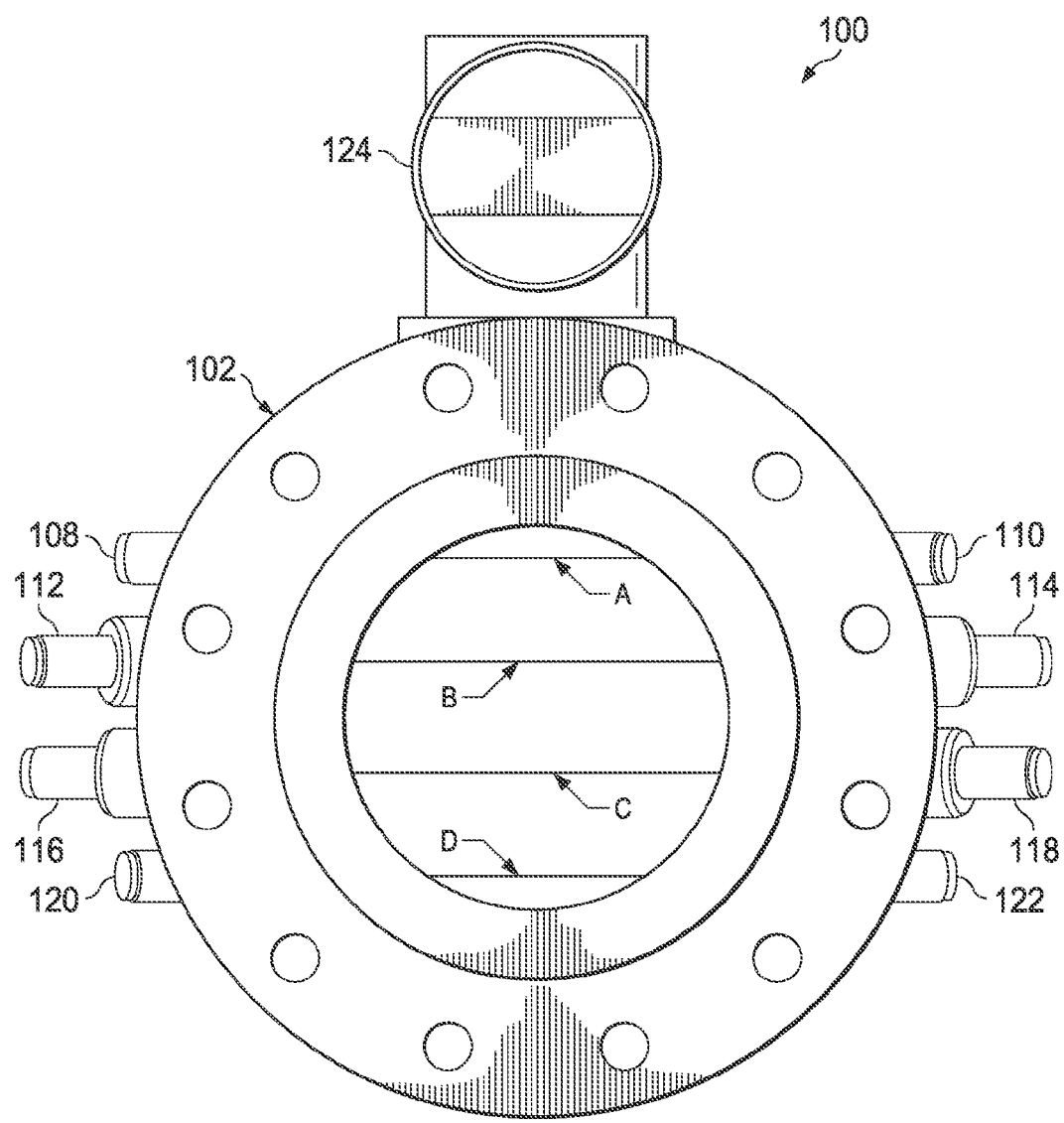
FIG. 3 shows an end elevation view of an ultrasonic flowmeter in accordance with various embodiments.

Ultrasonic flowmeters can have one or more chords. FIG. 3 illustrates an end elevation view of ultrasonic flowmeter 100. In particular, illustrative ultrasonic flowmeter 100 comprises four chordal paths A, B, C and D at varying levels within the spool piece 102. Each chordal path A-D corresponds to a transducer pair behaving alternately as a transmitter and receiver. Transducer assemblies 108 and 110 (only partially visible) make up chordal path A. Transducer assemblies 112 and 114 (only partially visible) make up chordal path B. Transducer assemblies 116 and 118 (only partially visible) make up chordal path C. Finally, transducer assemblies 120 and 122 (only partially visible) make up chordal path D.

Figure 4:
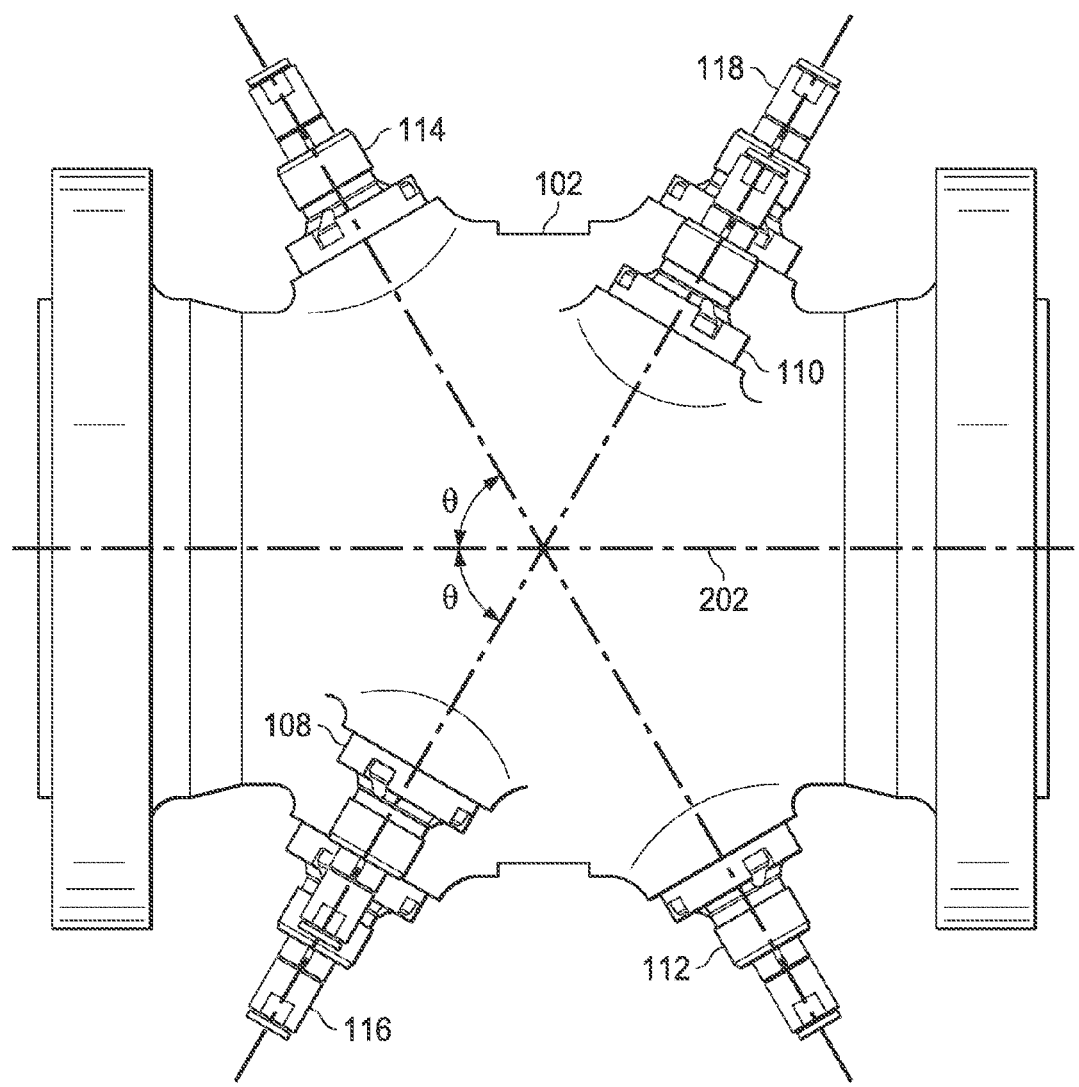
FIG. 4 shows an arrangement of transducer pairs of an ultrasonic flowmeter in accordance with various embodiments.

A further aspect of the arrangement of the four pairs of transducers is shown with respect to FIG. 4, which shows an overhead view. Each transducer pair corresponds to a single chordal path of FIG. 3; however, the transducer assemblies are mounted at a non-perpendicular angle to the center line 202. For example, a first pair of transducer assemblies 108 and 110 is mounted at a non-perpendicular angle θ to centerline 202 of spool piece 102. Another pair of transducer assemblies 112 and 114 is mounted so that the chordal path loosely forms the shape of an "X" with respect to the chordal path of transducer assemblies 108 and 110. Similarly, transducer assemblies 116 and 118 are placed parallel to transducer assemblies 108 and 110, but at a different "level" or elevation. Not explicitly shown in FIG. 4 is the fourth pair of transducer assemblies (i.e., transducer assemblies 120 and 122). Considering FIGS. 2, 3 and 4, the transducers pairs may be arranged such that the upper two pairs of transducers corresponding to chords A and B form an the shape of an "X", and the lower two pairs of transducers corresponding to chords C and D also form the shape of an "X". The flow velocity of the fluid may be determined at each chord A-D to obtain chordal flow velocities, and the chordal flow velocities are combined to determine an average flow velocity over the entire pipe. From the average flow velocity, the amount of fluid flowing in the spool piece, and thus the pipeline, may be determined.

Figure 5:
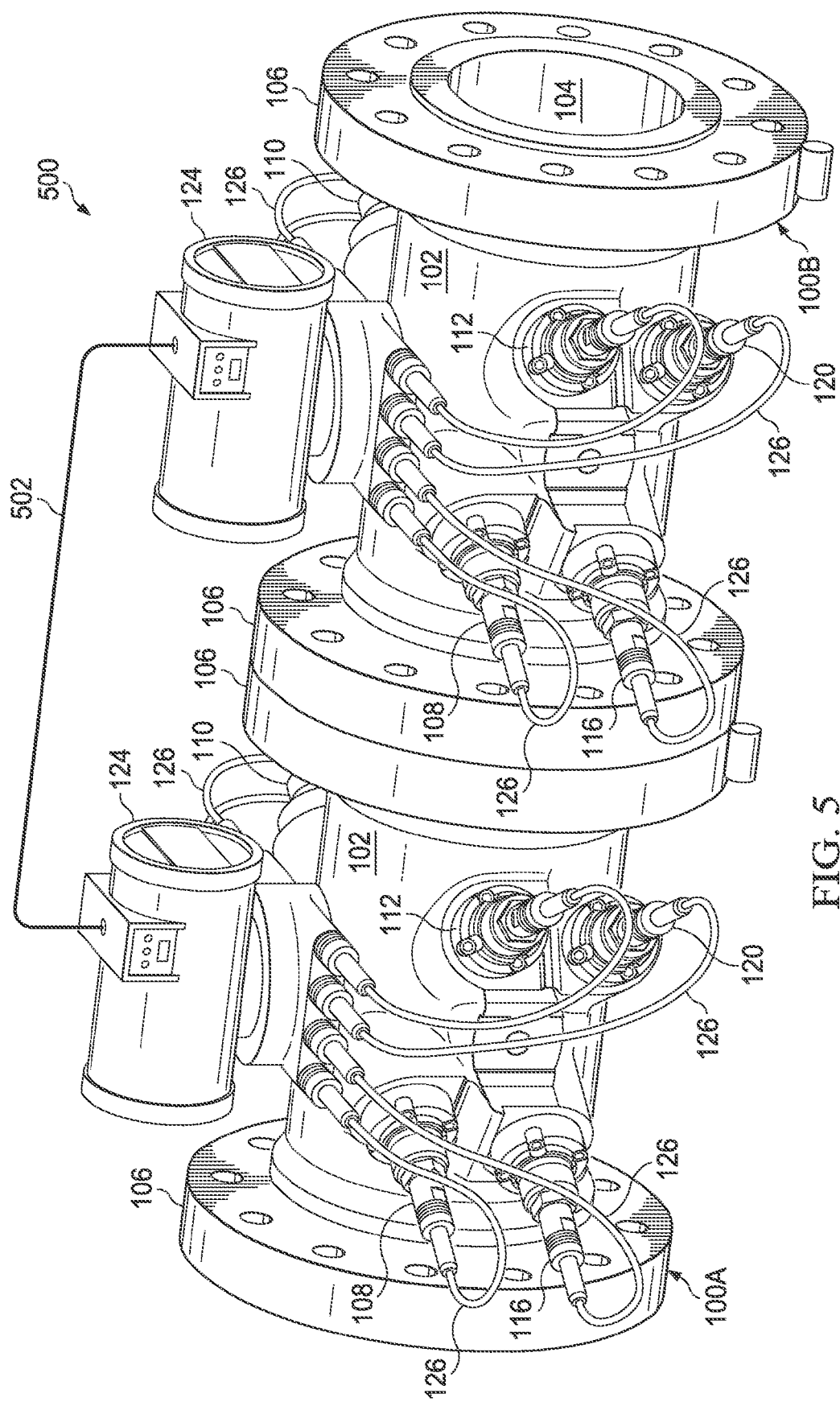
FIG. 5 shows a flow metering system including a pair of co-located ultrasonic flowmeters configured for meter substitution in accordance with various embodiments.

Embodiments of the present disclosure couple a plurality of ultrasonic flowmeters (e.g., instances 100A/B of the flowmeter 100) to provide enhanced flow measurement accuracy. FIG. 5 shows a flow metering system 500 including a pair of co-located ultrasonic flowmeters 100 coupled in series. Other embodiments may include a different number of coupled co-located flowmeters and/or a different number of total or per flowmeter chordal paths. The electronics of the pair of flowmeters are communicatively coupled using a communication link 502, which may be a local area network (LAN) or any other apparatus for exchanging data between the flowmeters 100A/B. The electronics of each flowmeter 100 exchanges flow measurement values with the other flowmeter, and computes a combined flow rate value based on flow measurements provided by both flowmeters 100. By combining the pair of four path meters 100, the system 500 forms an eight path flowmeter that provides improved measurement accuracy over each individual four path flowmeter 100. In some embodiments, the ultrasonic transducers of the two or more flowmeters 100 may be disposed in a single spool piece and/or the control electronics 124 of the two or meters may be disposed in a single enclosure. In further embodiments, the two or more flowmeters 100 may include different chordal configurations, for example, different chord elevations, angles, etc. relative to the flow path that provide for improved measurement accuracy when the measurements of the flowmeters 100 are combined.

Each flowmeter 100 of the system 500 is configured to accurately estimate the velocity of a fluid stream flowing through the system 500 when the other of the flowmeters 100 is non-operational or fails to provide a flow measurement (e.g., a fluid stream velocity measurement). To provide accurate flow velocity estimates when a co-located flowmeter 100 fails, each flowmeter 100 records historical values of flow velocity for the flowmeters 100, and computes a system 500 flow velocity based on a substitute flow value derived from the historical values in lieu of a measured flow velocity value that is lacking due to a failed flowmeter 100.

In embodiments of the flowmeter 100, the maximum velocity range of a fluid stream through the system 500 is partitioned into a number of consecutive non-overlapping "bins, where a bin refers a subrange of possible flow velocities or storage allocated for recording information associated with the subrange as described herein. For each flowmeter 100 of the system 500 a set of bins is maintained, and in each bin is recorded a historical value indicative of the average flow velocity of the associated flowmeter 100 within the velocity range of the bin.

When a flowmeter 100 is operating properly, an average flow velocity value for the flowmeter 100 is recorded in the corresponding bin. In some instances, a given flowmeter 100 may be unable to combine a measured velocity value from another flowmeter 100 with its own (e.g., because the value is corrupt or has not been received) to compute average flow velocity through the system 500. In such instances, the given flowmeter 100 may apply the historical flow velocity value (i.e., a substitution value) retrieved from the appropriate bin in conjunction with a measured flow velocity (e.g., of the given flowmeter) to compute the average velocity of the fluid stream flowing through the system 500. The appropriate bin may be selected based on the measured flow velocity of the given flowmeter 100. If the measured flow velocity falls between the velocities recorded in two adjacent bins, then interpolation may be applied to improve the accuracy of the substitution value. Embodiments may apply linear interpolation, polynomial interpolation, spline interpolation, or other interpolation methods.

Table 1 below shows an exemplary arrangement of bins in the flowmeter 100A that record average velocity values in feet per second (fps) for the flowmeter 100A and the flowmeter 100B co-located with the flowmeter 100A.

TABLE 1

| | Average Velocity Bins | | |
|---|---|---|---|
| Bin No. | Bin Range (fps) | Meter Avg. Velocity (fps) | Co-located Meter Avg. Velocity (fps) |
| 1 | 0-20 | 5.1 | 5.15 |
| 2 | 20-40 | 24.00 | 23.95 |
| 3 | 40-60 | 54.00 | 54.02 |
| 4 | 60-80 | 71.00 | 71.01 |
| 5 | 80-100 | 95.00 | 95.03 |

If the co-located flowmeter 100B fails, then the flowmeter 100A generates a substitute value for average flow velocity of the flowmeter 100B based on the values stored in the bins. For example, if the average flow velocity measured by the flowmeter 100A is in the range of 60-80 fps and flowmeter 100B has failed, then flowmeter 100A may compute an average flow velocity for the system 500 based on the value recorded in bin 4 for the c-located flowmeter 100B in conjunction with the measured flow velocity for the flowmeter 100A.

Some embodiments of the flowmeter 100 may compute the substitute value as:

$$V_{sub} = \left[\frac{(MeaVel_A - LBinVel_A)(UBinVel_B - LBinVel_B)}{(UBinVel_A - LBinVel_A)}\right] + LBinVel_B \quad (1)$$

where:
$MeaVel_A$ is the measured average velocity of flowmeter 100A;
$LBinVel_A$ and $UBinVel_A$ are the lower and upper of two adjacent bins for which the measured average velocity of flowmeter 100A falls between the average velocities recorded in the bins for flowmeter 100A;
$LBinVel_B$ and $UBinVel_B$ are the lower and upper of two adjacent bins corresponding to $LBinVel_A$ and $UBinVel_A$ that contain average velocities recorded for flowmeter 100B.

For example, if the flowmeter 100A measured an average flow velocity of 62 fps for a given measurement interval, and flowmeter 100B has failed (e.g., failed to provide a flow velocity value for the interval), then applying equation (1) and the recorded velocity values of Table 1, the flowmeter 100A may compute a substitute velocity value for flowmeter 100B as:

$$V_{sub} = \left[\frac{(62-54)(71.01-54.02)}{(71-54)}\right] + 54.02 \approx 62.02.$$

The flowmeter 100A may compute the average flow velocity of the fluid stream through the system 500 as the average of $V_{sub}$ and the measured average flow velocity of flowmeter 100A $$\left(e.g., \frac{62+62.02}{2}\right).$$

Operations described above with regard to flowmeter 100A are applicable to all co-located flowmeters.

Some embodiments of the flowmeter 100 store proportion values for co-located flowmeters in the bins rather than or in addition to the average velocity values. A proportion value may comprise a multiplier that can be applied to a measured average velocity to produce a substitute velocity value for a failed meter. Similar to interpolation of velocity values described above, the proportion values can be interpolated to produce a more accurate multiplier when the measured velocity falls between two recorded velocities. The substitute value for the failed meter can be combined with measured velocity values to compute the average velocity of the fluid stream through the system 500.

Table 2 below shows an exemplary arrangement of bins that record average velocity values for the flowmeter 100A and a proportion value for the flowmeter 100B co-located with the flowmeter 100A.

TABLE 2

Average Velocity/Proportion Bins

| Bin No. | Bin Range (fps) | Meter Avg. Velocity (fps) | Co-located Meter Proportion |
|---|---|---|---|
| 1 | 0-20 | 5.1 | 1.098 |
| 2 | 20-40 | 24.00 | .998 |
| 3 | 40-60 | 54.00 | 1.00037 |
| 4 | 60-80 | 71.00 | 1.00014 |
| 5 | 80-100 | 95.00 | 1.000316 |

Embodiments may apply the measured velocity of the flowmeter 100A and the proportion value for the failed flowmeter 1008 to compute the substitute value as:

$$V_{sub} = MeaVel_A \left[ \left( \frac{(MeaVel_A - LBinVel_A)(UBinProp_B - LBinProp_B)}{(UBinVel_A - LBinVel_A)} \right) + LBinProp_B \right] \quad (2)$$

where:

$LBinProp_B$ and $UBinProp_B$ are the lower and upper of two adjacent bins corresponding to $LBinVel_A$ and $UBinVel_A$ that contain proportion values recorded for flowmeter 100B.

In some embodiments of the ultrasonic flowmeter 100 that store proportion values for co-located flowmeters in the bins rather than or in addition to the average velocity values, the proportion values represent the contribution of the flow velocity value measured by a flowmeter to the average flow velocity of the fluid stream flowing through the system 500. Such embodiments ignore velocity values for failed flowmeters and apply the proportion values to measured flow velocities of non-failed flowmeters to compute the average velocity of the fluid stream through the system 500.

Table 3 below shows an exemplary arrangement of bins that record average velocity values and proportion values for the flowmeter 100A.

TABLE 3

Average Velocity/Proportion Bins

| Bin No. | Bin Range (fps) | Meter Avg. Velocity (fps) | Meter Proportion |
|---|---|---|---|
| 1 | 0-20 | 5.1 | .995 |
| 2 | 20-40 | 24.00 | 1.1262 |
| 3 | 40-60 | 54.00 | .999815 |
| 4 | 60-80 | 71.00 | .99993 |
| 5 | 80-100 | 95.00 | .99984 |

Embodiments may apply the measured velocity of the flowmeter 100A and the proportion value for the failed flowmeter 100A to compute the average velocity of the fluid stream through the system 500 as:

$$V_{avg} = MeaVel_A \left[ \left( \frac{(MeaVel_A - LBinVel_A)(UBinProp_A - LBinProp_A)}{(UBinVel_A - LBinVel_A)} \right) + LBinProp_A \right] \quad (3)$$

where:

$LBinProp_A$ and $UBinProp_A$ are proportion values, corresponding to $LBinVel_A$ and $UBinVel_A$, recorded for flowmeter 100A.

Operations described above with regard to a particular flowmeter 100 (e.g., flowmeter 100A) are applicable to all co-located flowmeters. Furthermore, while as a matter of convenience the computations described above are with reference to a pair of flowmeters 100 co-located and sharing flow measurements to improve measurement accuracy, the computations can easily be extended to include more than two co-located flowmeters 100. Thus, embodiments of the present disclosure encompass meter substitution for any number of co-located flowmeters 100.

Figure 6:
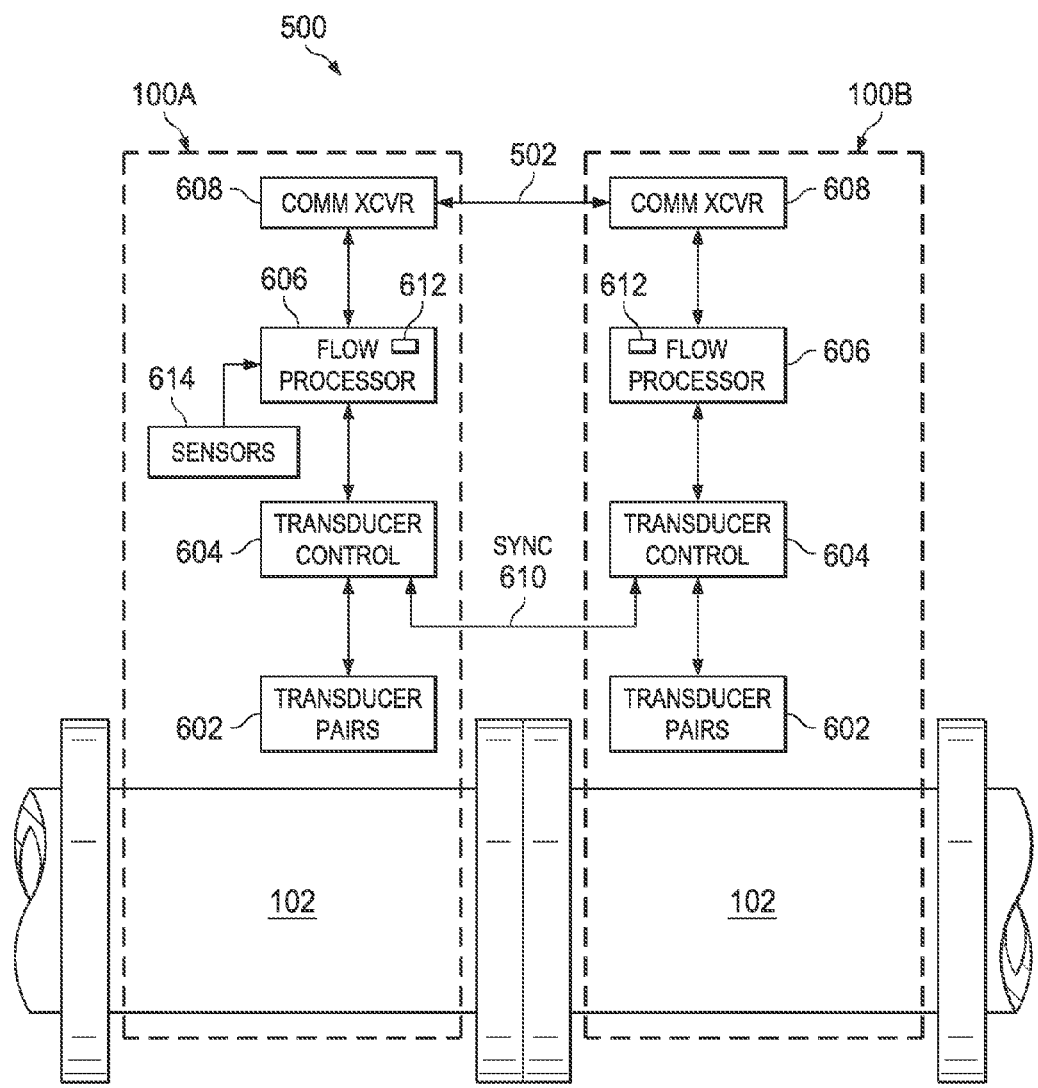
FIG. 6 shows a block a diagram of a flow metering system that includes co-located ultrasonic flowmeters configured for meter substitution in accordance with various embodiments.

FIG. 6 shows a block a diagram of the flow metering system 500 that includes co-located ultrasonic flowmeters 100A/B in accordance with various embodiments. Each of the flowmeters 100 includes a set of transducer pairs 602 (e.g., 108 and 110, 112 and 114, 116 and 118, 120 and 122) and electronics comprising a transducer controller 604, a flow processor 606, and a communications transceiver 608. Some embodiments may also include one or more sensors 614 for measuring fluid attributes. The transducer controller 604 is coupled to the transducer pairs 602, and controls generation of ultrasonic signals by the transducer pairs 602 by, for example, generating drive signals that induce oscillation in the transducers. In some embodiments, the transducer controllers 604 of the flowmeters 100A/B synchronize the generation of ultrasonic signals via a synchronization signal 610.

The flow processor 606 is coupled to the transducer controller 604, and is configured to process outputs of the transducer pairs 602 to generate measurements of fluid flow within the spool piece 102. For a given chord, the chordal flow velocity v may be given by $$v = \frac{L^2}{2X} \cdot \frac{T_{up} - T_{dn}}{T_{up} T_{dn}}$$

where:

L is the path length (i.e., face-to-face separation between upstream and downstream transducers), X is the component of L within the flowmeter bore in the direction of the flow, and $T_{up}$ and $T_{dn}$ are the upstream and downstream transit times of sound energy through the fluid.

The flow processor 606 combines the chordal flow velocities to determine an average flow velocity for the fluid flowing through flowmeter 100, and computes the volumetric flow rate through the flowmeter 100 as a product of the average flow velocity for the flowmeter 100 and the cross-sectional area of the flowmeter 100.

Embodiments of the flow processor 606 are also configured to compute flow through the spool piece 102 by combining flow measurements, such as fluid stream velocity, provided by one flowmeter 100 with those provided by a different flowmeter 100. Thus, the flow processor 606 of each flowmeter 100 may be configured to produce combined flow velocity values based on flow velocities generated by all communicatively coupled flowmeters 100. The combined flow velocities may be more accurate than the flow velocities generated by any one of the flowmeters 100 individually.

To generate a combined flow velocity, the flow processor 606 is configured to periodically (e.g., a periodic flow computation time interval—every 250 milliseconds (ms), every second, etc.) process ultrasonic signals, and compute one or more initial flow velocity values based on the outputs of the transducer pairs 602 controlled by the flowmeter (e.g., the flowmeter 100A). In some embodiments, values other than flow velocity may be generated and exchanged (e.g., speed of sound along a chord, average speed of sound, flow velocity along a chord, flow measurement quality, etc.). The flow processor 606 makes the initial flow velocity values available for retrieval by other flowmeters 100 in real-time (i.e., the time period (e.g., 250 ms) set for generating flow values by the flowmeter 100 is unaffected by the retrieval and associated operations).

The flow processor 606 verifies the initial flow velocity values received from the other flowmeter 100. For example, the flow processor 606 may verify that an expiration time value associated with the flow velocity values has not expired, that a provided flow measurement quality value indicates valid measurements, that message check characters indicate valid data, etc. If the verification indicates that the received flow velocity values are valid, then the flow processor 606 combines the initial flow velocity values provided by the other flowmeter 100 with the initial flow velocity values computed by the flow processor 606 to generate a combined flow velocity value. Some embodiments may combine the initial flow velocity values by computing an average of the initial flow velocity values generated by the flowmeters 100.

The flow processor 606 may store the combined flow velocity value and/or a flow rate derived from the combined flow velocity value in memory, provide the value to a database, and/or generate signals representative of flow rate, flow volume, etc. based on the combined flow value. For example, some embodiments of the flow processor 606 may generate an output signal having a frequency representative of a flow rate derived from the combined flow value.

The flow processor 606 includes meter substitution logic 612. If the flow processor 606 of the flowmeter 100A (or any flowmeter 100) is unable to verify the initial flow velocity values received from another flowmeter 100, then the flow processor 606 may compute a substitute value as described above, and compute a final flow velocity value for the system 500 based on the substitute value and/or the initial flow velocity value generated by one or more of the non-failed flowmeters 100.

The meter substitution logic 612 generates the previously described bins, and initializes the bins to predetermined average velocity and/or proportion values. For example, the meter substation logic 612 may initialize each bin to a median velocity/proportion value appropriate for the velocity range supported by the bin.

During operation of the system 500, the meter substitution logic 612 updates the initial bin values. When the flow processor 606 receives valid flow velocity values, the meter substitution logic 612 updates the velocity and/or proportion values associated with the bin corresponding to the received value. The updating may comprise replacing the current bin value with a value based on only the received value, or with a value based on both the received value and the current bin value or previous velocity values. For example, some embodiments of the meter substitution logic 612 may replace the current bin velocity value with a received velocity value, or compute a new proportion value based on the received value (but not the current bin value) and replace the current bin value with the new proportion value. Some embodiments of the meter substitution logic 612 update the bin value based on a moving average or another filter function. Thus, such embodiments update the bin value based on a received flow value and the current bin value or previously received velocity values.

The meter substitution logic 612 may perform the updating based on the validity of received flow velocity values. Some embodiments may require that flow velocity values received from all flowmeters 100 be valid to enable updating of any bin. Some embodiments may require that only the flow velocity value received from a flowmeters 100 corresponding to a bin be valid to enable updating.

Various components of the flowmeter 100 including at least some portions of the flow processor 606 and meter substitution logic 612 can be implemented using a processor, included in the flowmeter 100. The processor executes software programming that causes the processor to perform the operations described herein. In some embodiments, the meter substitution logic 612 includes a processor executing software programming that causes the processor to maintain the average flow velocity/proportion bins for each flowmeter of the system 500, generate substitution values, and perform other operations described herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software instructions that cause a processor to perform the operations disclosed herein can be stored in a computer readable storage medium internal or external to the flowmeter 100. A computer readable storage medium comprises volatile storage such as random access memory, non-volatile storage (e.g., a hard drive, an optical storage device (e.g., CD or DVD), FLASH storage, read-only-memory), or combinations thereof.

Some embodiments can implement portions of the ultrasonic flowmeter 100, including portions of the flow processor 606 and the meter substitution logic 612, using dedicated circuitry (e.g., dedicated circuitry implemented in an integrated circuit). Some embodiments may use a combination of dedicated circuitry and a processor executing suitable software. For example, some portions of flowmeter 100 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 7:
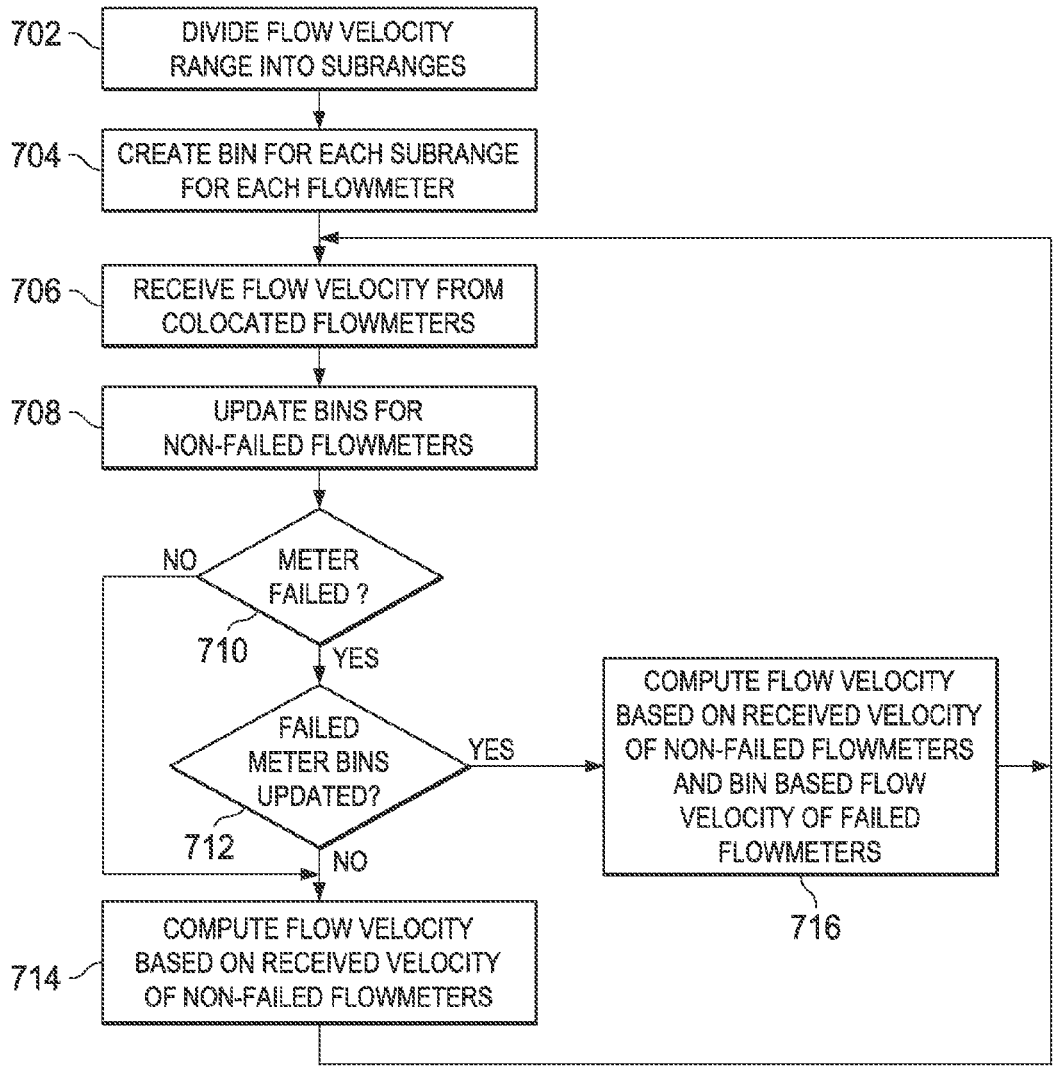
FIG. 7 shows a flow diagram for a method for meter substitution using co-located ultrasonic flowmeters in accordance with various embodiments.

FIG. 7 shows a flow diagram for a method 700 for meter substitution using co-located ultrasonic flowmeters in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 7, as well as other operations described herein, can be implemented as instructions stored in a computer readable medium and executed by processors included in the flowmeters 100.

In the method 700, a plurality of ultrasonic flowmeters 100 are co-located (e.g., serially connected or disposed in a single spool piece) and each flowmeter 100 is generating flow values based on the ultrasonic transducer pairs 602 of all of the co-located flowmeters 100. Each operation described with regard to the method 700 is applicable to each co-located flowmeter 100. In block 702, the maximum flow velocity of flowmeter 100 is subdivided in a plurality of subranges. As exemplified in Table 1, the degree of velocity variation encompassed by each subrange may be equal across subranges (20 fps in Table 1). In some embodiments, the subrange size may differ from subrange to subrange.

In block 704, the flowmeter 100 allocates storage space for information related to each subrange and each co-located flowmeter 100 (i.e., creates a bin for each subrange). Each bin may be structured to store a velocity value and/or a proportion value associated with the corresponding velocity subrange and flowmeter 100. The flowmeter 100 assigns initial values to the flow velocity variable(s) of each bin.

In block 706, the ultrasonic flowmeter 100 is generating ultrasonic signals. The signals traverse the interior of the spool piece 102, and are detected by an ultrasonic transducer. Electrical signals representative of the detected ultrasonic signals are provided to the flow processor 606. The flowmeter 100 computes, based on the ultrasonic signals generated and detected by the transducer pairs 602 of the flowmeter 100, an average flow velocity of the fluid stream flowing through the flow meter 100. The flowmeter 100 also receives flow velocity values from each other co-located flowmeter 100. Each flow velocity value received from a given co-located flowmeter is computed from the ultrasonic transducer measurements of the given co-located flowmeter.

In block 708, the flowmeter 100 updates the velocity values recorded in each bin based on the received velocity values. In some embodiments, recorded velocity values are updated for each properly operating (i.e., non-failed) flowmeter. For example, if no flow velocity values are received from a given co-located flowmeter, or the received flow values are deemed corrupt, then the velocity values for the given flowmeter are not updated. For each non-failed flowmeter 100, the received flow velocity values are examined, and the bin corresponding to the velocity values is updated. Updating may include replacing the current stored velocity value with the received value, or with a value based on the received value and any number of previously received values. In other embodiments, a bin for a flowmeter 100 is valid only if the flow values received from a plurality of co-located flowmeters 100 are valid. For example, some such embodiments, may compute the recorded velocity value based on received velocity values from a plurality of flowmeters 100.

In block 710, the flowmeter 100 begins the computation of a system 500 flow velocity based on the flow velocities measured by all of the co-located flowmeters 100. If none of the co-located flowmeters are deemed to have failed for the current measurement interval (e.g., all have provided a valid flow velocity value), then the flowmeter 100 computes an average flow velocity for the system 500 based on the flow velocity values provided by all of the co-located flowmeters in block 714.

If one of the co-located flowmeters is deemed to have failed for the current measurement interval (e.g., a flowmeter failed to provide a valid flow velocity value), then, in block 712, the flowmeter 100 determines whether the velocity bins corresponding to the failed flowmeter 100 have been updated since bin initialization. For example, the flowmeter 100 may select one or more bins for the failed flowmeter 100 corresponding to the average flow velocity computed based on the ultrasonic transducers of the non-failed flowmeter 100. If the values stored in the selected bins are other than the initialization values, then the flowmeter 100 may deem the bins updated.

If the selected bins of the failed flowmeter have been updated since initialization, then, in block 716, the flowmeter 100 computes an average flow velocity for the system 500. Some embodiments compute a substitute flow velocity value for the failed flowmeter based on the values (velocity/proportion values) stored in the selected bins. In such embodiments, the flowmeter 100 computes average flow velocity for the system 500 based on the received velocity values for non-failed co-located flowmeters and the substitute flow velocity value for the failed flowmeter. Some embodiments compute the average flow velocity for the system 500 based on the recorded proportion values for the non-failed flowmeters 100.

The above discussion is meant to be illustrative of various exemplary embodiments of the present invention. Numerous variations and modifications will become apparent to those skilled in the art once the above disclosure is fully appreciated. For example, while embodiments of the invention have been discussed with relation to a pair of co-located ultrasonic flowmeters, those skilled in the art will understand that embodiments are applicable to any number of co-located flowmeters. Furthermore, while embodiments have been discussed with regard to flowmeters having four chordal paths, those skilled in the art will understand that embodiments encompass flowmeters having any number of chordal paths, including co-located flowmeters each having a different number of chordal paths. It is intended that the following claims be interpreted to embrace all such variations and modifications.

What is claimed is:

1. An ultrasonic flow metering system, comprising:
a plurality of ultrasonic flowmeters, each of the flowmeters comprising:
 a flow processor configured to:
  maintain a plurality of velocity bins, each of the bins corresponding to a flow velocity range for the flowmeters;
  maintain, within each of the bins, a value indicative of past average velocity of fluid flow through a given one of the flowmeters associated with a given one of the bins;
  determine, responsive to the given one of the flowmeters having failed, an estimated average fluid flow velocity through the system based on the values maintained within the bins;
  wherein the given one of the flowmeters is a different one of the flowmeters from a one of the flowmeters that is to determine the estimated average fluid flow velocity responsive to the given one of the flowmeters having failed.

2. The system of claim 1, wherein the flow processor is configured to:
determine, responsive to failure of the given one of the flowmeters, an estimated average fluid flow velocity through the given one of the flowmeters based on the values maintained in the bins; and
determine the estimated average fluid flow velocity through the system by combining the estimated average fluid flow velocity through the given one of the flowmeters and a measured average fluid flow velocity through a non-failed one of the flowmeters.

3. The system of claim 1, wherein the flow processor is configured to store as the value, in the given one of the bins, an average of flow velocities measured by the given one of the flowmeters that are within the velocity range of the given one of the bins.

4. The system of claim 3, wherein the flow processor is configured to update the value based on none of the flowmeters being failed.

5. The system of claim 1, wherein the flow processor is configured to store as the value, in the given one of the bins, a proportional contribution of the average flow velocity of the given one of the flowmeters to an average flow velocity of the flowmeters.

6. The system of claim 1, wherein the flow processor is configured to store as the value, in the given one of the bins, a ratio of average flow velocity of the given one of the flowmeters to average velocity of a different one of the flowmeters.

7. The system of claim 1, wherein the flow processor is configured to update the value based on the given one of the flowmeters being non-failed.

8. The system of claim 1, wherein the flow processor is configured to:
store an initialization value in each of the bins; and
determine the estimated average flow velocity based on the value maintained within the given one of the bins only after the initialization value stored in the given one of the bins has been updated in accordance with a measured flow velocity value.

9. The system of claim 1, wherein the flow processor is configured to determine the estimated average flow velocity by interpolating between the values stored in two of the bins based on the average flow velocity of a non-failed one of the flowmeters being between the values recorded in the two of the bins.

10. The system of claim 1, wherein the flow processor is configured to determine flow velocity through the flowmeters based on at least one of the flowmeters being non-failed.

11. A method for flowmeter substitution, comprising:
dividing, by each flowmeter of a plurality of serially coupled ultrasonic flowmeters, a fluid flow velocity measurement range of the flowmeters into a plurality of velocity subranges;
maintaining, by each of the flowmeters, a plurality of bins, each of the bins corresponding to one of the velocity subranges;
maintaining, by each of the flowmeters, within each of the bins, a value indicative of average flow velocity through each other one of the flowmeters;
determining, by a non-failing one of the flowmeters, responsive to failure of a given one of the flowmeters, an estimated average flow velocity through the plurality of flowmeters based on the values maintained within the bins.

12. The method of claim 11, further comprising:
determining, responsive to failure of the given one of the flowmeters, an estimated average fluid flow velocity through the given one of the flowmeters based on the values maintained in the bins; and
determining the estimated average fluid flow velocity through the flowmeters by combining the estimated average fluid flow velocity through the given one of the flowmeters and a measured average fluid flow velocity through a non-failed one of the flowmeters.

13. The method of claim 11, further comprising storing as the value, an average of flow velocities measured by the given one of the flowmeters that are within the velocity range of a corresponding one of the bins.

14. The method of claim 11, further comprising storing as the value a proportional contribution of the average flow velocity of the given one of the flowmeters to an average flow velocity of the flowmeters.

15. The method of claim 11, further comprising storing as the value a ratio of average flow velocity of the given one of the flowmeters to average velocity of a different one of the flowmeters.

16. The method of claim 11, further comprising updating the value based on none of the plurality of flowmeters being failed.

17. The method of claim 11, further comprising updating the value based on the given one of the flowmeters being non-failed.

18. The method of claim 11, further comprising:
storing an Initialization value in each of the bins; and
determining the estimated average flow velocity based on the value maintained within a given one of the bins only after the initialization value has been changed responsive to a flow velocity measurement.

19. The method of claim 11, further comprising determining the estimated average flow velocity by interpolating between the values stored in two of the bins based on the average flow velocity of a non-failed one of the flowmeters being between the values corresponding to the two of the bins.

20. The method of claim 11, further comprising determining flow velocity through the flowmeters based on at least one of the flowmeters being non-failed.

21. An ultrasonic flowmeter, comprising:
a passage for fluid flow;
a pair of ultrasonic transducers configured to form a chordal path across the passage between the transducers; and
a flow processor coupled to the ultrasonic transducers, and configured to:
measure the flow velocity of a fluid stream flowing through the passage based on outputs of the transducers;
exchange measured flow velocity values with a different flowmeter disposed to measure flow velocity of the fluid stream; and
compute, in response to failure of the different flowmeter, an estimated average flow velocity of the fluid stream based on the flow velocity measured by the flow processor and a historical value of flow velocity for the different flowmeter maintained by the flow processor.

22. The ultrasonic flowmeter of claim 21, wherein the flow processor is configured to:

maintain a plurality of velocity bins, each of the bins corresponding to a velocity range for the fluid stream; and maintain historical values of flow velocity in the bins, wherein each historical value is indicative of average velocity of the fluid stream through one of the ultrasonic flowmeter and the different flowmeter.

23. The ultrasonic flowmeter of claim 22, wherein the flow processor is configured to determine, based on failure of the different flowmeter, an estimated velocity of the fluid stream flowing through the different flowmeter based on the historical values maintained in the bins.

24. The ultrasonic flowmeter of claim 21, wherein the historical value comprises an average of flow velocities measured by the different flowmeter that are within a predetermined subrange of flow velocities measureable by the different flowmeter.

25. The ultrasonic flowmeter of claim 21, wherein the historical value comprises a proportional contribution of flow velocity measured by the flow processor to an average flow velocity of the fluid stream.

26. The ultrasonic flowmeter of claim 21, wherein the historical value comprises a ratio of flow velocity measured by the flow processor to flow velocity measured by the different flowmeter.

27. The ultrasonic flowmeter of claim 21, wherein the flow processor is configured to update the historical value based on both of the ultrasonic flowmeter and the different flowmeter being non-failed.

28. The ultrasonic flowmeter of claim 21, wherein the flow processor is configured to update the historical value based on the different flowmeter being non-failed.

29. The ultrasonic flowmeter of claim 21, wherein the flow processor is configured to:

initialize the historical value; and compute the estimated average flow velocity based on the historical value only after the flow processor has updated the historical value responsive to the different flowmeter providing a valid measured flow velocity to the flow processor that is within a predetermined subrange of flow velocities corresponding to the historical value.

30. The ultrasonic flowmeter of claim 21, wherein the flow processor is configured to determine the estimated average flow velocity by interpolating between different historical values based on flow velocity measured by the flow processor being between historical values for average flow velocity.

* * * * *